United States Patent
Gether et al.

(10) Patent No.: US 6,691,526 B2
(45) Date of Patent: Feb. 17, 2004

(54) METHOD AND APPARATUS FOR HEATING AND COOLING OF BUILDINGS

(75) Inventors: Jørgen Gether, Stavern (NO); Harald Gether, Trondheim (NO)

(73) Assignee: Gether AS, Stavern (NO)

( * ) Notice: Subject to any disclaimer, the term of this patent is extended or adjusted under 35 U.S.C. 154(b) by 0 days.

(21) Appl. No.: 10/220,925

(22) PCT Filed: Mar. 5, 2001

(86) PCT No.: PCT/NO01/00087

§ 371 (c)(1), (2), (4) Date: Sep. 5, 2002

(87) PCT Pub. No.: WO01/67004

PCT Pub. Date: Sep. 13, 2001

(65) Prior Publication Data

US 2003/0019230 A1 Jan. 30, 2003

(30) Foreign Application Priority Data

Mar. 9, 2000 (NO) .......................................... 20001247

(51) Int. Cl.[7] .......................... F25B 27/00; F25B 13/00; G05D 23/00

(52) U.S. Cl. ...................... 62/238.7; 237/2 B; 62/238.6; 62/324.3

(58) Field of Search .............................. 62/238.6, 238.7, 62/324.3; 237/2 B

(56) References Cited

U.S. PATENT DOCUMENTS

| | | | | |
|---|---|---|---|---|
| 4,100,763 A | * | 7/1978 | Brody | 62/238.6 |
| 4,403,731 A | * | 9/1983 | Katz | 237/2 B |
| 4,420,947 A | * | 12/1983 | Yoshino | 62/160 |
| 4,790,477 A | * | 12/1988 | Forkin et al. | 237/2 B |
| 5,924,486 A | * | 7/1999 | Ehlers et al. | 165/238 |

FOREIGN PATENT DOCUMENTS

| | | |
|---|---|---|
| CA | 2322556 | 9/2000 |
| DE | 2 232 069 | 1/1974 |

(List continued on next page.)

OTHER PUBLICATIONS

Varis Bokalders: Energisnala hus, 1981, ICA bokforlag, Vasteras, side 71 (with English translation).

*Primary Examiner*—Ira S. Lazarus
*Assistant Examiner*—Filip Zec
(74) *Attorney, Agent, or Firm*—Merchant & Gould, P.C.

(57) ABSTRACT

This invention relates to a method and apparatus for energy effective regulation of temperature and ventilation of one or more ventilation units of buildings, where one or more heat-pumps are used to exchange thermal energy between outdoor air and an indoor heat carrying fluid medium and where the heating and/or cooling of each ventilation units are achieved by distributing the indoor heat carrying fluid medium in each ventilation units, in such a manner that the natural short term variations in outdoor temperature due to passages of weather systems and the day/night variations is utilized to give the one or more heat-pumps optimized conditions such that they are only turned on for extracting outdoor heat which is delivered to the indoor heat carrying and distributing fluid medium at the relative warm periods in the case of warming the buildings, or only in the relative cold periods for cooling the heat carrying and distributing fluid medium for removal of indoor heat in the case of cooling the buildings, and that the thermal energy that is exchanged with the outdoor air is partly used to cover the ventilation units actual demand for heading or cooling while the remaining major part of the thermal energy is sent to a thermal store to cover the ventilation units heating or cooling demand during the subsequent periods where the natural weather conditions is less favorable for exchanging thermal energy from outdoor air by use of heat-pumps.

19 Claims, 4 Drawing Sheets

FOREIGN PATENT DOCUMENTS

| | | | |
|---|---|---|---|
| DE | 2232069 | 1/1974 | |
| DE | 19502372 A1 * | 8/1996 | ............. F24F/5/00 |
| DE | 195 02 372 A1 | 8/1996 | |
| DE | 198 09 974 A1 | 9/1999 | |
| DE | 19809974 | 9/1999 | |
| DE | 199 00 358 A1 | 7/2000 | |
| EP | 0 676 594 A2 | 11/1995 | |
| GB | 2 096 305 A | 10/1992 | |
| SE | 425576 | 10/1982 | |
| SE | 7612059-1 | 10/1982 | |

* cited by examiner

US 6,691,526 B2

METHOD AND APPARATUS FOR HEATING AND COOLING OF BUILDINGS

This invention relates to a method and apparatus for heating and cooling (climate control) of buildings and houses, where a typically 5–15 day thermal storage is integrated with heat-pumps and ventilation to operate in a particularly optimised synergy.

BACKGROUND

Large geographical areas in the world has a climate that generally goes through a seasonal change from a warm period in the summer to a cold period in the winter. This seasonal variation is naturally greatly dependent the local topography, whether there is an inland or coastal climate and the actual global latitude in question, but will nevertheless usually be of such an extent that buildings/houses needs means for cooling during the warm season and heating during the cold season in order to keep a comfortable indoor temperature of 20–22° C. For example, in Norway the mean temperatures may vary from −5° C. to +20° C. over a year, while Mediterranean countries and large parts of USA may typically see mean temperature changes from 0° C. in winter to +30° C. in summer. Thus, regardless whether one has a cold or warm climate, a substantial amount of energy is needed to keep a comfortable temperature in buildings/houses.

For Norway, which has a relatively cold climate and practically no use of air-conditioning, there is estimated that 71% of the energy consumption in living houses is spent on heating and producing hot water. This figure is somewhat lower for commercial buildings due to a larger demand for electric energy to operate technical machinery. The total energy consumption for heating houses and commercial buildings is estimated to 42.5 TWh/year. Pro capita this amounts to about 10 MWh/year for heating purposes, where approximately ⅔ is hydroelectric power. Despite that there is huge variations in energy consumption patterns in different regions in the world, it is nevertheless obvious from these figures that vast amounts of energy is spent in the world on heating/cooling of houses and buildings, and that there is a huge potential for energy conservation in this sector.

PRIOR ART

It is known that heat-pumps are very efficient tools for extracting heat energy from a low-temperature source and deposit the heat in a relatively high-temperature area. In general terms one might say that a heat-pump works like an inverted refrigerator, and can normally deliver 3–4 times more heat than their required energy input for driving the process. That is, while direct heating systems like gas fired heaters, wood firing, electric heating etc. has a theoretical upper limit of 100% efficiency and a practical efficiency well below this limit, conventionally available heat-pumps normally have efficiency rates which is in the order of 300–400%. Thus by using industrially available heat-pumps, the reduction in the energy consumption for heating/cooling of buildings can therefore for be as much as 70–80%.

There are known several types of heat-pumps, which generally can be characterised according to which medium they collect from and deliver the extracted heat to. For buildings and houses the heat will normally be delivered to a medium that is able to distribute the heat in the building, which in practice means water or air that is subsequently circulated in the building. For the heat source of heat-pumps there is a general convention stating that the heat source should have as high a temperature as possible and preferably be relatively stable over the year. This has led to use of heat sources such as a fluid medium circulated in deep drilled holes in bedrock, in buried tubes in the soil, in tubes submerged in fresh water, rivers, sea-water etc.

However, there are a number of problems associated with this approach. Rock and soil have a very low thermal conduction, thus the rock/soil needs a substantial amount of time to replace the heat extracted by the fluid medium. Thus one must employ rather lengthy loops and/or drilled holes in order to obtain a sufficiently large thermal store to allow long term extractions of heat without extensive cooling of the heat source. And as a consequence the investment cost often becomes prohibitive for this type heat extraction. The problem with low extraction capacity of the thermal stores can be solved by using open water as the heat source. It is possible to extract large amounts of heat from water at relatively small volumes (short extraction loops) due to a high specific heat capacity of water and the opportunity to replace extracted heat by convection. Also, water will at moderate depths have a stable and beneficially high temperature of 4° C. Thus water is in many respects an ideal heat source. However, there are problems with corrosion and fouling, especially in sea-water, and this solution is strictly restricted to buildings and houses in the vicinity (within 100 m) of open water. The major part of buildings and houses lies outside this reach.

Another approach to reduce the high investment costs for heat-pumps is to extract heat from open air and transfer this heat to water or air that is distributed inside the buildings/houses. These heat-pumps may be installed directly it the walls of existing houses and give a point delivery of heat in the form of hot air. Such solutions are very competitively priced, but has a major drawback in that they significantly looses effect when the demand for heat is largest. That is, they loose much of their beneficial heat extraction effect when the open air temperature becomes low (below 0° C.). Also, such solutions have encountered severe problems with freezing up of heat exchanger surfaces when the open-air temperature has fallen below +2° C. Thus this solution is generally considered to be only suited for coastal climates where the temperature seldom falls below 0° C.

Another approach for reducing the energy consumption for heating or cooling of buildings is to employ the natural seasonal temperature variations to build up sufficiently large thermal stores which is to be used in the following season to heat or cool the building. An example of such technology is SE 425 576. For instance, the heat resulting from solar radiation can be used advantageously for the heating of buildings and can eliminate the need for energy consuming heating systems. This form of passive solar heat gain is achieved through the architecture of the building by designing the building for optimising the absorption of solar rays over daily and annual cycles. That is, heat is accumulated by allowing the incident solar rays to fall onto a large thermal mass (generally walls or soil in the inside of the building), or is concentrated by various forms of heat collectors, and similarly accumulated. Greater or lesser heating is achieved by varying the amount of shade from the sunlight. The accumulation of heat allows it to be stored and used later when necessary. However, for cold climates the available solar radiation is less than for warmer climates while the need for heat is larger. As a consequence, the thermal stores must be very large in order to contain sufficient heat for a long and cold winter and also require extensive thermal insulation in order to preserve the heat over long periods (several months). Thus this solution is also encumbered with prohibitive costs, and have therefore not found general use.

OBJECTIVE OF THE INVENTION

The main objective of this invention is to provide a method and apparatus for heating and cooling of buildings and houses that solves the above given problems.

It is further an objective of this invention to provide

BRIEF DESCRIPTION OF THE INVENTION

The objectives of the invention may be achieved by the features as set forth in the following description and appended claims.

Figure 1:
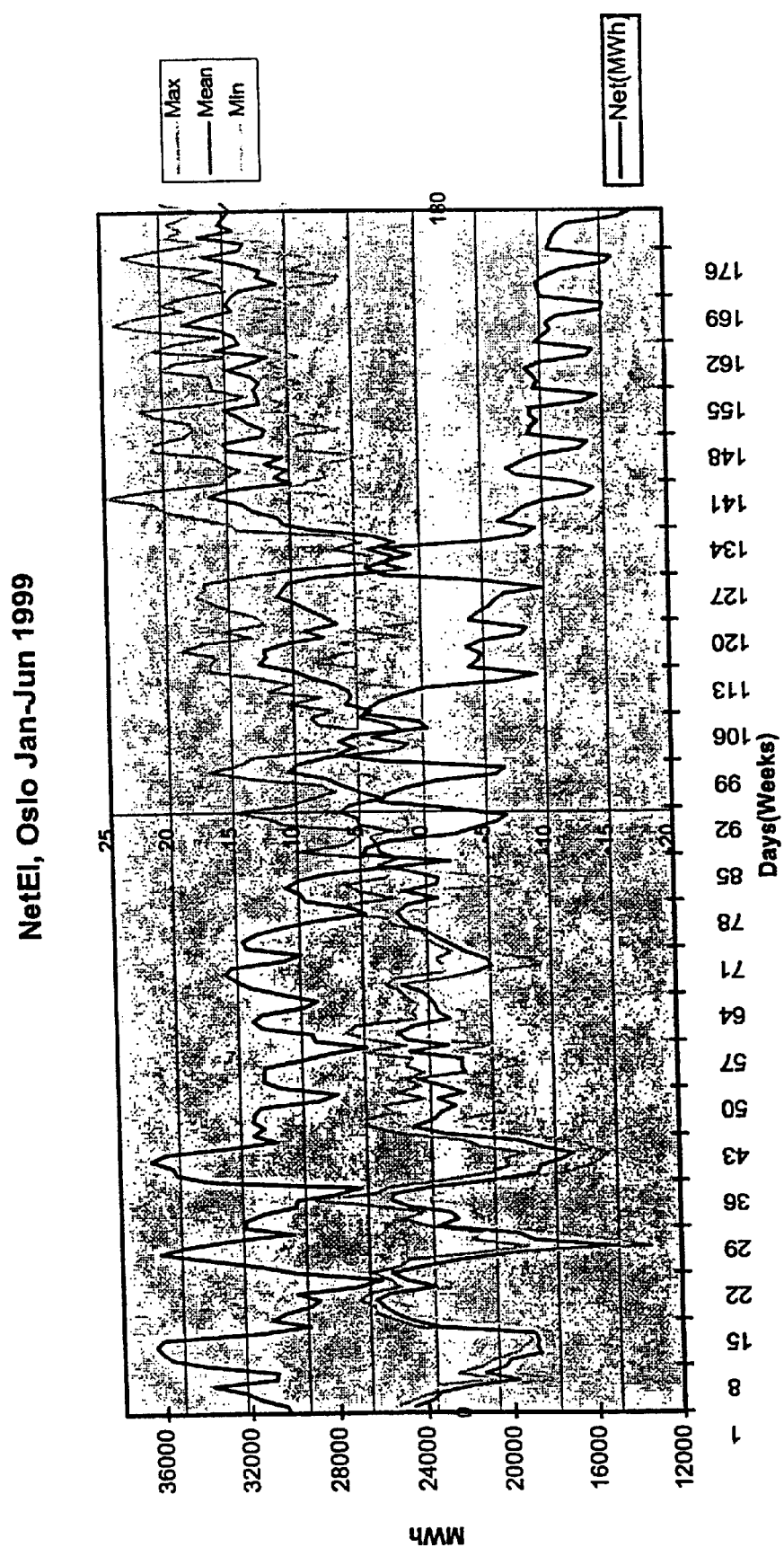
FIG. 1 shows a typical example of how the mean day-time temperature varies over a year in an inland climate (city of Oslo), with simultaneous variation in consumption of electric power.

The objectives of this invention can be achieved by exploiting characteristic features of natural temperature variations in the outdoor climate. The outdoor temperature will in many areas go through three typical patterns of natural variation; day/night, passage of weather systems and seasonal changes. An example of such natural variations are illustrated in FIG. 1 which gives the mean day air temperature in the first half of 1999 for the city of Oslo, Norway. It is the temperature variations due to passage of weather systems which typically occurs in 1–15 days and the day/night variation that is of interest, since these can be utilised to extract heat to warm buildings in relatively mild/warm periods, or vice versa, to discharge heat to cool buildings in relatively cool/cold periods, and then accumulate this heat/cold in moderately sized thermal stores with moderate thermal insulation.

Thus, in the case of heating buildings/houses in a cold climate, a special beneficial synergy is obtained by employing a heat-pump which extracts heat from outdoor air during these relatively warm periods and then stores this heat in a moderately sized and isolated thermal store which has capacity of storing 5–15 days heat consumption. Such a system will avoid the disadvantages of conventional air-to-air heat-pumps, since operation of the heat-pump at only relatively warm periods ensures optimal working conditions such that a maximum heat extraction efficiency is achieved. Thus the full potential of the beneficial heat-pump technology is ensured at all climates, and at the same time the risk for production interruptions due to frost formation in the fans is minimised since the warm periods will typically give outdoor air temperatures above 0° C., or at least only a few degrees minus. In the case of cooling of buildings/houses in a warm period the situation becomes reversed. Now it is the relatively cold periods due to passage of weather systems and/or at night that is utilised by using a heat pump to build up a sufficient supply of cold matter in the thermal store which can be applied at a later stage to keep the temperature down in the buildings/houses during periods of warm weather.

In order to obtain a heat carrying medium for heating/cooling the buildings/houses with an optimum temperature regardless the fill degree of the thermal store, it is preferred that the store is designed as one or several tubes that is filled with coarse particulate matter and that the loading or extraction of heat from the store is performed by sending a heat carrying medium comprising a fluid through the tube(s). In this manner, the thermal store will gain a warm and a cold end since the heat becomes partitioned between the fluid phase and the solid particulate phase according to the working principle of gas-chromatographic columns. That is, as long as a thermal equilibrium between the particulate matter and the heat carrying fluid is substantially obtained within a reasonable time, the transition zone between the cold part and the warm part in each tube(s) will consist of a narrow area with a sharp temperature gradient and where the cold and the warm zone will have a homogeneous (but of course different) temperature (see FIG. 3). Thus, by sending the heat carrying medium through the thermal store in one or the opposite direction, one can readily obtain a warm or cold medium for heating/cooling, respectively. Also, the fill degree of the store can easily be measured by detecting the position of the temperature gradient between the hot and cold zone.

One advantage with this type of thermal store is that it is possible to re-use construction materials as the solid particulate material, thus reducing the amount of waste disposal from the construction industry. However, all types of solid particulate materials can be used as fill material in the tubes as long as the grading of the particles is sufficiently narrow in order to form voids and channels between the solid particles, and thus to allow the fluid of the heat carrying medium to flow through the particulate fill material without an excessive fluid pressure loss. That is, the size distribution must be sufficiently narrow to avoid that smaller particles fill in the voids between larger particles. The thermal store may be situated under an adjoining outdoor area (e.g. a parking area) or may be incorporated within or underneath a building. It may be operated both horizontally and vertically.

Another advantage of the invention is that the heat extraction capacity of the heat-pump may be reduced compared to conventional use of heat-pumps, since there is no longer a need to ensure a heat extraction capacity to cover the heat consumption at the coldest expected weather when the heat-pump also has the lowest heat extraction efficiency. Thus one can employ smaller and cheaper heat-pumps since they are always run at optimised conditions since the extra heat demand at the cold periods are covered by extraction of heat from the thermal store. Another advantage of the invention is that by use of relatively short term climate variations, one can employ relatively small sized thermal stores with moderate insulation means. Especially when compared to systems where the seasonal temperature variations are employed. Thus, the thermal stores according to the invention will be economically very competitive compared to conventional stores.

Figure 2:
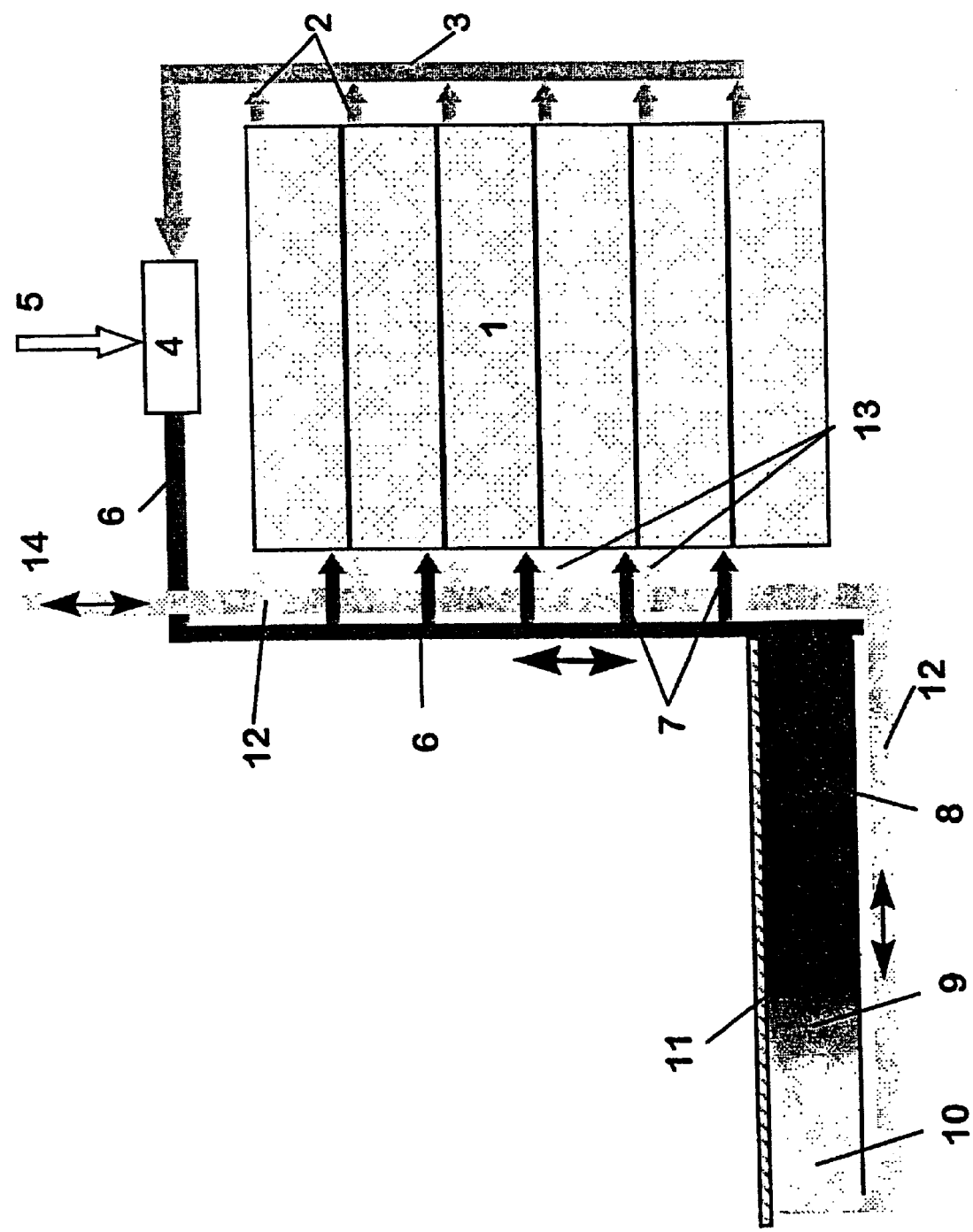
FIG. 2 shows a diagrammatic view of the working principle for a device for heating and/or cooling a building according to the invention.

The benefits of the opportunity to employ small scaled heat-pumps and thermal stores can be further enhanced by leading the used air from the houses/buildings to the heat pump for recovery of waste heat. That is, employing the heat-pump as a heat exchanger for reusing the waste heat in addition to the extraction of additional heat from outdoor air. This working principle is illustrated in FIG. 2, and will be thoroughly explained under the following detailed description of the invention.

In order to optimise the heat extracting conditions and to ensure that the thermal store has a sufficient supply of hot or cold particulate matter in order to meet the heating or cooling demand in the coming days, it is envisioned that the system incorporates software and regulation devices for making use of weather forecasts for the next 5–7 days to determine if and when the heat-pump should be engaged to fill the thermal store. That is, the regulation system includes sensors that monitor the filling degree of the thermal store, the actual weather conditions (temperature), and the actual drain rate of heat in the building/house, and employs this information together with the weather forecast to decide when the heat pump should be activated and when the heating/cooling demand can be optimally covered by the accumulated hot/cold matter in the thermal store. In this way, the energy consumption for heating/cooling buildings can be further reduced.

Thus in sum, the invention provides a very energy efficient and economically viable method and device for heating of buildings and houses, which in principle is analogous to the energy efficient hybrid engine solution for cars where a small sized combustion engine is constantly run at optimised efficiency for production of electric energy at just above the mean energy need for propulsion of the car, and where the surplus electricity is stored in batteries to be used by the electric propulsion engines at periods with extra load. The method can be applied for any type building or house, such as apartment buildings, commercial buildings, office buildings, store houses etc., and can be adapted to heat/cool one or several separate rooms or areas in one or several houses/buildings. For simplicity, each heating/cooling zone will be called ventilation unit (VU) in the following.

DETAILED DESCRIPTION OF THE INVENTION

The invention will be further explained by way drawings and examples of preferred embodiments.

The working principle of the invention may be seen from the schematic presentation of FIG. 2, where reference numeral 1 depicts a series of ventilation units, 2 denotes ventilation ducts for suction of used air from each VU, 3 is a duct that leads the used air to a heat-pump 4, 5 is a supply line for outdoor air to the heat-pump 4, 6 is a duct that leads the fresh heated air exiting the heat-pump 4 into the VU's via ducts 7 and/or to the hot end 8 of a thermal store 11. The thermal store also has a cold end 10 and a heat transfer zone 9. 14 is a second outdoor air intake that is connected via duct 12 to ventilation ducts 13 for supplying cold air to each VU and/or to the cold end 10 of the store 11.

Each VU is supplied with hot air by ducts 7, and cold air by ducts 13, when the device is in heating modus. The hot air is, depending on the weather conditions and the fill degree of the thermal store, supplied by extracting hot air from the hot end 8 into duct 6 as long as the fill degree of the store is satisfactory. In this case cold air is sucked in through inlet 15 and sent to the cold end 10 of the store 11. In the case when the thermal store is less than satisfactory filled in order to meet the expected heat demand the coming period, the heat-pump 4 will be activated and hot air lead to the ventilation ducts 7 by duct 6. Eventual surplus hot air will then be directed into the hot end 9 of the store 11 for accumulation of heat. The cold air exiting the cold end of the thermal store 11 will be discharged through duct 12 and inlet 14.

Generally, an air-to-air heat-pump will take in cold fresh outdoor air and extract some of it's heat content and pass this heat over to a separate air-stream that is employed to heat the VU such that the cold fresh air will be further chilled and discharged. Thus, a heat-pump can shift from raising the temperature to lowering it, and by connecting this discharge outlet for cold air to the cold end of the thermal store (not shown in FIG. 2), the heat-pump can be employed to build up cold matter in the store and/or to cool the ventilation units 1 directly by leading the cold air into the them through duct 12 and 13. Thus the principle solution as presented in FIG. 2 may also be employed to cool the ventilation units. In this case, hot air will be discharged through an outlet on duct 6 (not shown), and used air will be discharged from an outlet on duct 3.

Further in this example, the working principle of the invention includes optimised utility of four factors;

1. the energy drain/gain by each ventilation unit and the sum of this for all units
2. the filling degree of the thermal store
3. the weather forecast for the coming 5–7 days
4. the micro-climate (local climate) of individual buildings/houses.

The energy drain/gain is typically a result of outdoor temperature, time of day and day in week, and is the total sum of settings for ventilation and temperature by the individual ventilation units. Weather forecasts provide two types of information; forecast of expected outdoor temperatures and forecast of expected weather type (overcast, windy, solar heating etc.) for the coming days. Micro-climate parameters such as total energy gain/drain, time of day, day in week, time of year, and outdoor temperature are registered and stored for each ventilation unit in order to provide a statistically sufficient basis for employing the weather forecast to estimate the coming days energy drain/gain. This estimate and the filling degree of the thermal store (as measured by the ratio hot/cold zone) are employed to determine when and for how long the heat-pumps should be engaged.

Also, the following factors are incorporated into the operation scheme of the invention; Used ventilation air is normally the cheapest source for heat since it generally has a higher temperature and thus a higher heat content than outdoor air. Used air is therefore the primary heat source while outdoor air is a secondary heat source which covers the additional demand. The heat-pump(s) is/are always employed at optimum (full) load, since there is no need for adjusting the output to the actual drain rate of the VUs as long as the surplus heat can be accumulated into the thermal store. And in the case the thermal store is filled, the heat pump is turned off, and all heat demand will be supplied by the thermal store. Thus one can employ relatively simple heat-pump(s) without capability of regulating the load, and thus gain an economical advantage and optimal operating conditions.

The operation of heat-pump(s) and the auxiliary valves and fans for driving the air-streams in the apparatus, is performed by a regulation system that is under control of a software program that determines the operation modus of the apparatus according to estimates of the expected heat/cooling demand the coming 5–7 days and the actual user settings of fresh air and temperature of each VU, Such software way run on ordinary and available PC-type computers.

EXAMPLE 1

Figure 3:
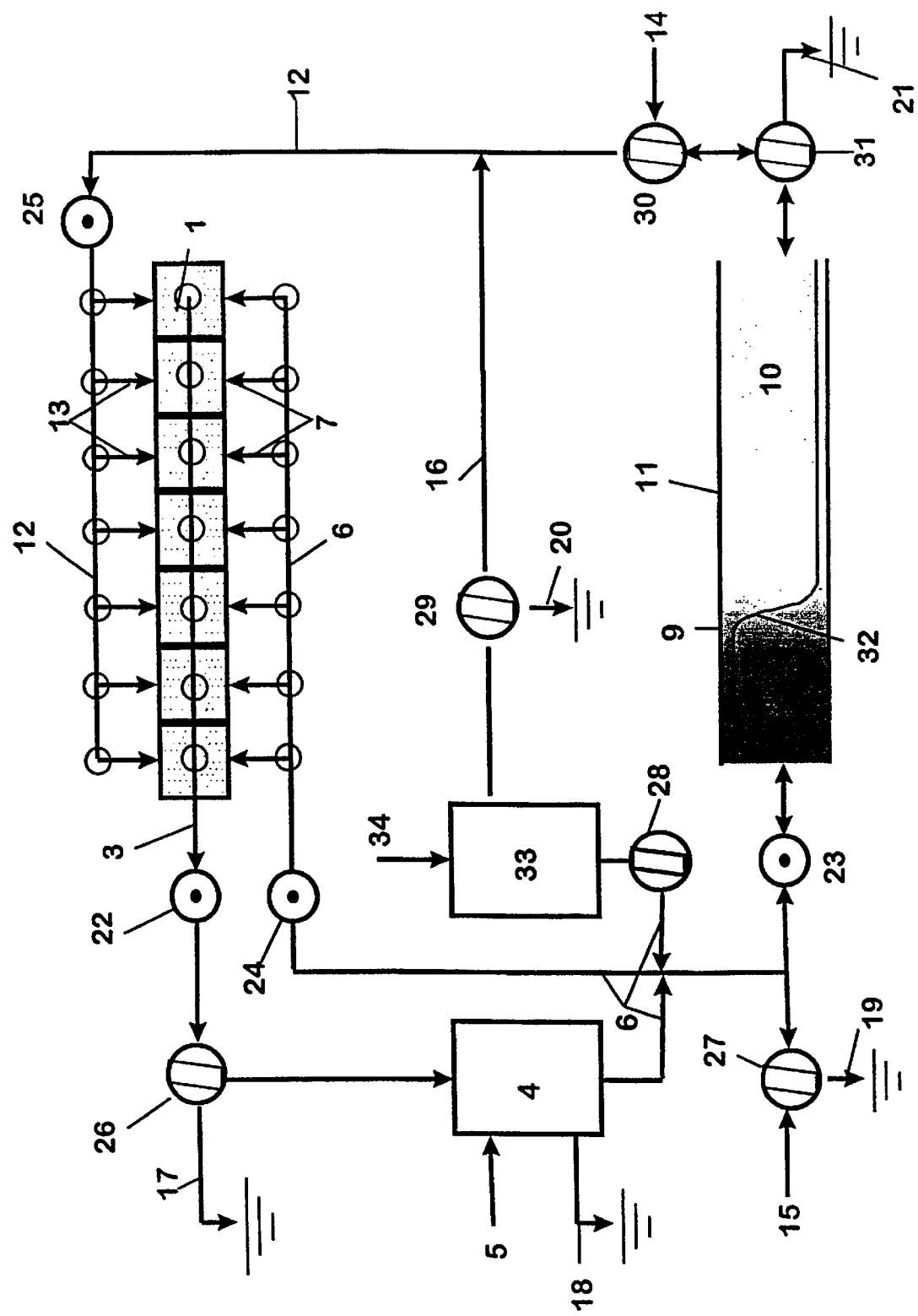
FIG. 3 shows a schematic view of a preferred embodiment of a device for heating and/or cooling a building according to the invention.

A preferred embodiment of the invention that is particularly versatile and suited for climates with large seasonal temperature variations is schematically presented in FIG. 3. Here reference numeral 1 denotes a series of ventilation units, 3 is a duct for used air which is equipped with a fan 22 and a two 2-way flow diverter 26 for leading the used air either to a discharge outlet 17 or to a heat-pump 4. Heat-pump 4 is connected to an inlet duct 5 for fresh outdoor air, a discharge outlet 18, and a branch of duct 6 for supplying warm fresh air. The duct 6 runs from the hot end 8 of the thermal store or storage 11 to the inlet ducts 7 of each VU 1, and is equipped with fan 23 and 24. Duct 6 is also connected to fresh air intake 5 which is equipped with a 2-way flow diverter 27 and discharge outlet 19. Another branch of duct 6 is connected to a second heat-pump 33, and is equipped with a 2-way flow diverter 28. The second heat-pump 33 is supplied with fresh outdoor air from inlet 34 and is equipped with a cold fresh air outlet 16 that in the other end is connected to the supply duct for cold fresh air 12. Duct 16 is equipped with a 2-way flow diverter 29 and a discharge outlet 20. Further, supply duct 12 for cold fresh air runs from the cold end 10 of the thermal storage 11 to the inlet ducts 13 of each ventilation unit 1, and it is equipped with fan 25, a 2-way flow diverter 10 with fresh outdoor air inlet 14 and a 2-way flow diverter 31 with outlet discharge 21.

Thus, each ventilation unit is given the opportunity to have both the temperature and ventilation (supply of fresh air) regulated. The units may be flats, offices or suites of offices, or individual rooms in these. Each VU is kept close to barometric pressure by balancing fresh air input to used-air removal, and the used-air ducting 3 is always under suction. Heat transfer is achieved by ventilation air. Temperature is adjusted at individual outlets by balancing the streams of warm and cool fresh air. The thermal store 11 consist of one or several tubes filled with granulated concrete with average diameters of 20–60 mm. Typical dimensions are 1–1.5 m in diameter and a length of 3–20 m, preferably 5–10 m. The total amount of granulated concrete should be about 0.5–2.0 $m^3$ per $m^2$ floor area of the ventilation units that is to be heated/cooled, depending on the local climate and degree of insulation of the ventilation units. The temperature of the hot zone in the thermal store should be in the range 30–60° C., preferably 35–50°, and more preferably 40–45° C., while the cold zone should be about 5–20° C., preferably 7.5–15° C., and most preferably 8–12° C. The thermal store is depicted on a horizontal position, but can be oriented in any angle against the horizon. Also, there should preferably be provided means for drainage of condensed water. This is especially important for humid and warm climates where the apparatus is mainly engaged in cooling of the ventilation units. This can be provided by simply giving the tubes a slight inclination relative to the horizontal plane and some kind of drainage duct for discharging the condensed water. The linear flow velocity of the ventilation air during passage through the thermal store tubes is preferably about 1–2 m/s or less in order to ensure a rapid thermal equilibrium and moderate pressure losses. A rapid thermal equilibrium is important for achieving a steep temperature gradient (reference numeral 32 in FIG. 3) and correspondingly short transition zone 9 between the hot 8 and cold zone 10 in the thermal store.

Also, by using two heat-pumps, a possibility exists for boosting the accumulation speed for filling the thermal store if only a short period of suitable outdoor temperatures is forecast. This feature enhances the overall energy reduction of the invention, since the probability of being forced to run the heat-pumps at less than optimal outdoor temperatures is reduced.

As mentioned, the operation of the preferred embodiment is performed in a set of different modes by selected turning on/off of fans and heat-pumps, and positioning of 2-way diverters/valves. It is preferred that the modes of operation are:

I. Neutral

In this case, there is sufficient heat production from other sources in the building. Outdoor air at 14 passes through fan 25 to VUs 1, and is discarded via used air fan 22 and diverter 26.

II. Heating

IIa: Normal heating mode, warm air supplied to or from the thermal store depending on outdoor temperature. Like mode I, but diverter 26 shifted to pass used air through heat-pump 4, where fresh air is taken through 5, heated and moved by fan 24 to VUs 1. Depending on outdoor temperature heat-pump 4 may deliver more or less air than required by VUs 1.

IIb: If surplus heat produced by heat-pump 4, AND thermal core full OR mild/warm weather forecast, then heat-pump 4 is turned off, outdoor air admitted at 14, diverted through thermal store by diverters 30 and 31, and transferred as warm fresh air by fan 24 to VUs 1.

IIc: If surplus heat produced by heat-pump 4, AND thermal store NOT full, AND cool/colder weather expected, remainder from heat-pump 4 is transferred to thermal store through 2-way fan 23, and diverted to exit at diverter 31. The system may switch between IIb and IIc for minimising load on heat-pump 4.

IId: If mild/warm now, AND cold weather expected, AND thermal store NOT full, then heat-pump 33 is started, taking outdoor air at full capacity and charging thermal store at 2–3 times ordinary flow rate through 2-way fan 23 with exit of cold air at 31. At the same time, fan 24 delivers warm air to VUs as demanded.

III. Cooling

IIIa: If warm weather, then warm air enters through 15 and diverter 27 through fan 24 as warm, fresh air to VUs 1. Warm air through 15 and 27 passes through the thermal store 11, is cooled, and goes via diverters 31 and 30, and fan 25 as cool, fresh air to VUs 1.

IIIb: If cool/cold weather, then cool fresh air enters at 14, passes through diverters 30 and 31 to charge the thermal store, and exit as warm fresh air through 2-way fan 23 and exit via diverter 27. Some of this air is led through fan 24 to VUs 1 as fresh, warm air, depending on demand from the VUs.

IIIc: If lasting warm weather, with the thermal store in danger of being exhausted, then heat-pump 33 is turned on and warm fresh air enters through 34 to be cooled in heat-pump 33, and then passed through diverter 29 both to fan 25 and to VUs 1 for cooling, and through diverters 30 and 31 to the thermal store 11 for charging, and exits as warm air through 2-way fan 23 and diverter 27.

Figure 4:
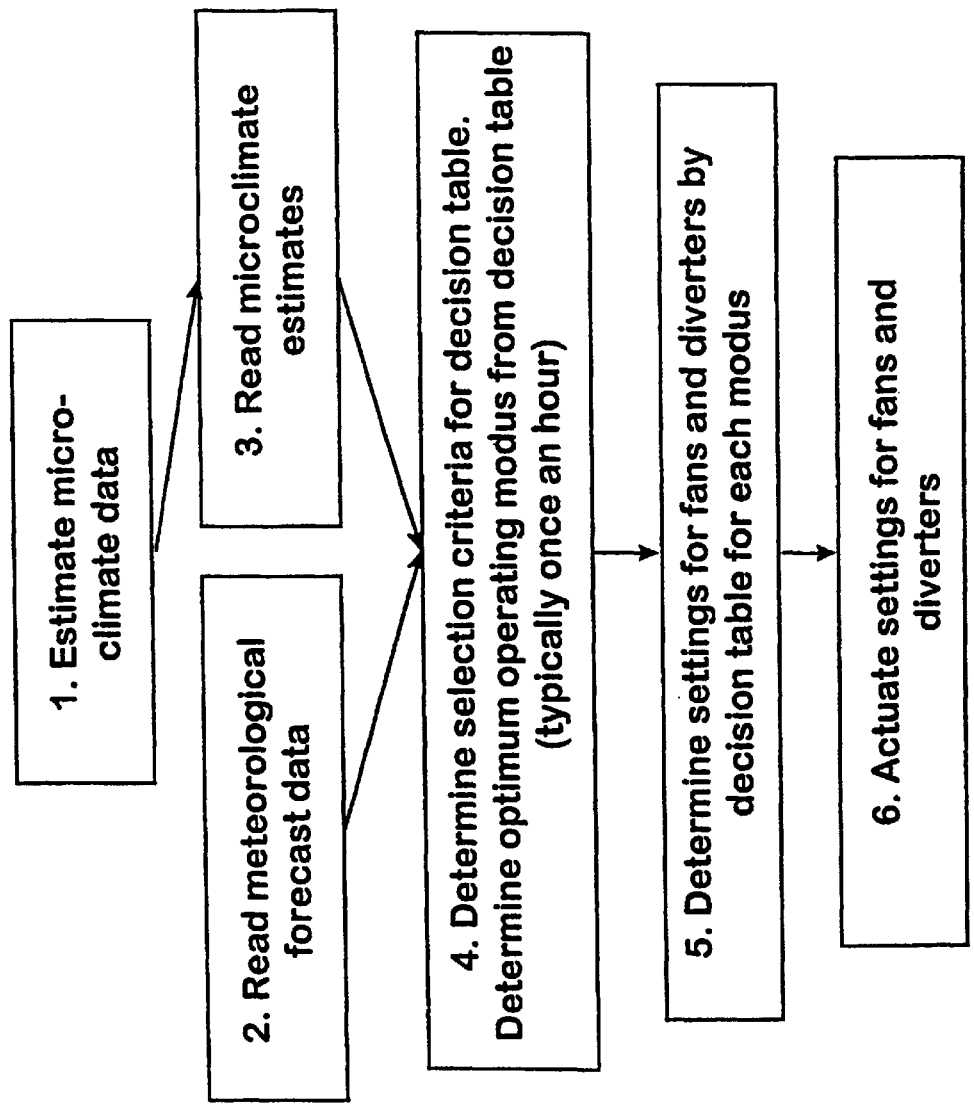
FIG. 4 is a flow sheet which shows the working principle for an auxiliary software for the logic control of the preferred embodiment shown in FIG. 3.

It is preferred that the software that selects which operation modus that is to be employed consists of six individual modules which co-operate as shown in FIG. 4. Module one is separate and should be given as an input from the operator of each apparatus, but should preferably be supplied by firms that offer this service as a speciality in order to ensure a sufficiently high hit percent in the predictions. The remaining modules should preferably be run on a local PC or CPU that is connected to the regulation device that controls and regulates the settings of fans, heat-pumps and diverters. The run frequency should be of the order of once per hour, and will typically run for 5–10 seconds each time.

In order to make the controlling software compact and fast such that it may be placed in a separate small computing unit that is integrated as a part of the apparatus, it is preferred that the individual modules are made quite simple with the main task determining selection criteria for searching in a first decision table to determine mode of operation (module 4), and settings of diverters and fans (module 5). Also the last module (module 6) should be simple, using standard cards to turn data from the program into actuating voltage for switches. In detail, module 4 determines a set of selection criteria by matching forecast data to demand for heating or cooling, and for whether the thermal core should deliver or store energy. Each criterion sets or clears a corresponding bit in a computer integer word (typically 32 bit length). This word in turn acts as a search profile.

The central concept of the software is the decision table, of which an example is shown in Table 1. The table makes it possible to determine in a very fast and easy way what operating mode should be selected for optimal saving of energy under a large set of weather conditions bye use of bits that are set or cleared in appropriate positions. With 30 individual criteria as in the table, some 1 billion alternatives may be specified. In practice some 30–200 is sufficient, depending on local climate peculiarities. Table 1 illustrates a few examples of individual specification for mode IIa, and overlapping modes I and IIIa (e.g. all weekdays are treated the same).

The alternatives (corresponding to columns in Table 4) are subsequently treated as integer numbers, and sorted in numerical order in a table with associated operating mode. The proper operating condition is then found by a binary search in this table with the calculated search profile. By ordering the individual selection criteria suitably, similar operating conditions will have similar numeric values, and the search will find the nearest optimal match if the actual value is not in the decision table. As shown in Table 1, the ordering instead groups similar criteria together, for pedagogical purposes. Actual grouping in practice, as well as specific alternatives, may vary according to local climatic conditions, and can easily be developed by a skilled person.

EXAMPLE 2

This example gives an example of a preferred embodiment of the invention that is suitable for cold climates and in some coastal climates where the need for active cooling is unlikely to occur. This embodiment is exactly similar to the embodiment of example 1, except that heat-pump 33, the right branch of duct 6 with 2-way flow diverter 28, and duct 16 with 2-way flow diverter 29 and discharge outlet 20 is omitted.

EXAMPLE 3

This example gives an example of a preferred embodiment of the invention that is suitable for warm climates where the need for active heating is unlikely to occur. This embodiment is exactly similar to the embodiment of example 1, except that heat-pump 4 with the left branch of duct 6 with 2-way flow diverter 26, fresh air inlet 5, and discharge outlet 20 is omitted.

Even though the invention has been described by way of examples of preferred embodiments that employs air as the heat carrying and distributing medium, it should be clear that the invention also relates to the general principle of heating/cooling of buildings by utilising natural short term variations in the climate in a combination of heat-pumps and a thermal store. Thus, there might be envisioned many alternative embodiments that is obvious for a skilled person and that falls within the scope of this invention, including other forms and types of thermal stores such as construction parts of the buildings themselves, water-pools, other heat carrying and distributing media such as water, etc.

TABLE 1

Example of decision table for specifying modes of operation

| Mode | Heating | | | Neutral | | Cooling | |
| --- | --- | --- | --- | --- | --- | --- | --- |
| Condition | IIa | IIb | ... | I | ... | IIIa | ... |
| Now >5° C. below BT | 1 | 0 | ... | 0 | ... | 0 | ... |
| Now 0–5° C. below BT | 0 | 1 | ... | 1 | ... | 0 | ... |
| Now 0–5° C. above BT | 0 | 0 | ... | 1 | ... | 0 | ... |
| Now >5° C. above BT | 0 | 0 | ... | 0 | ... | 0 | ... |
| >5° C. below BT in daytime | 0 | 0 | ... | 0 | ... | 0 | ... |
| 0–5° C. below BT in daytime | 1 | 1 | ... | 1 | ... | 0 | ... |
| 0–5° C. above BT in daytime | 0 | 0 | ... | 1 | ... | 0 | ... |
| >5° C. above BT in daytime | 0 | 0 | ... | 0 | ... | 0 | ... |
| >5° C. below BT at night | 0 | 0 | ... | 0 | ... | 0 | ... |
| 0–5° C. below BT at night | 1 | 1 | ... | 0 | ... | 0 | ... |
| 0–5° C. above BT at night | 0 | 0 | ... | 1 | ... | 0 | ... |
| >5° C. above BT at night | 0 | 0 | ... | 0 | ... | 0 | ... |
| >5° C. below BT in 3 days | 0 | 0 | ... | 0 | ... | 0 | ... |
| 0–5° C. below BT in 3 days | 1 | 1 | ... | 1 | ... | 0 | ... |
| 0–5° C. above BT in 3 days | 0 | 0 | ... | 1 | ... | 0 | ... |
| >5° C. above BT in 3 days | 0 | 0 | ... | 0 | ... | 0 | ... |
| Store empty of heat | 0 | 0 | ... | 0 | ... | 0 | ... |
| Store 0–20% of heat | 0 | 0 | ... | 0 | ... | 0 | ... |
| Store 20–40% of heat | 0 | 0 | ... | 1 | ... | 0 | ... |
| Store 40–60% of heat | 0 | 0 | ... | 1 | ... | 0 | ... |
| Store 60–80% of heat | 1 | 1 | ... | 1 | ... | 0 | ... |
| Store 80–100% of heat | 0 | 0 | ... | 0 | ... | 0 | ... |
| Store full of heat | 0 | 0 | ... | 0 | ... | 0 | ... |
| Monday | 1 | 1 | ... | 1 | ... | 1 | ... |
| Tuesday | 0 | 0 | ... | 1 | ... | 1 | ... |
| Wednesday | 0 | 0 | ... | 1 | ... | 1 | ... |
| Thursday | 0 | 0 | ... | 1 | ... | 1 | ... |
| Friday | 0 | 0 | ... | 1 | ... | 1 | ... |
| Saturday | 0 | 0 | ... | 0 | ... | 0 | ... |
| Sunday | 0 | 0 | ... | 0 | ... | 0 | ... |

What is claimed is:

1. A method of regulating temperature and ventilation in at least one ventilation unit with a regulating apparatus, the regulating apparatus including at least one heat pump and a thermal store, the method comprising:

exchanging thermal energy between outdoor air and an indoor heat carrying fluid medium with the at least one heat pump;

distributing the heat carrying fluid medium in the at least one ventilation unit to heat and/or cool the at least one ventilation unit;

monitoring natural short tern variations in outdoor temperature due to passages of weather systems and day/night variations; and optimizing the heat pump oonditions based on the monitored natural short term variations such that the at least one heat pump is used only for extracting outdoor heat that is delivered to the indoor heat carrying fluid medium at relative mild/warm periods in the case of warming a building that houses the at least one ventilation unit, or only in relative cool/cold periods for cooling the heat carrying fluid medium for removal of indoor heat in the case of cooling the building, wherein thermal energy that is exchanged with the outdoor air is partly used to meet actual heating or cooling demands for the at least one ventilation unit and the remaining portion of the thermal energy is sent to the thermal store to cover the ventilation unit heating or cooling demands for the at least one ventilation unit during subsequent periods where natural weather conditions are less favourable for exchanging thermal energy from outdoor air by use of the heat pump.

2. Method according to claim 1, wherein the heating demand is also covered by extracting heat from used air exiting the at least one ventilation unit(s).

3. Method according to claim 1, further comprising estimating future heating or cooling demand of the at least one ventilation unit based on a 5–7 day weather forecast and this estimate is employed together with an actual degree of filling of the thermal store to determine when and for how long the at least one heat pump should be engaged in order to build up an optimal thermal storage for the coming 5–7 days.

4. Method according to claim 1, wherein an actual micro-climate, as measured by heat drain or gain of the at least one ventilation unit, outdoor temperature, user settings, time of day, day of week, and season, is stored to build up a data-base which is to be used for estimating 5–7 days of future heating or cooling demand of the at least one ventilation unit.

5. Method according to claim 1, wherein fresh hot and cold air is employed as the heat carrying and distributing fluid medium for heating or cooling the at least one ventilation unit of the building, and the ventilation and heat regulation of the at least one ventilation unit is achieved by suction of used air from the at least one ventilation unit which is replaced by balanced amounts of cold and/or hot fresh air to provide a desired temperature of fresh replacement air in the at least one ventilation unit.

6. Method according to claim 1, wherein in order to obtain a stable and equal temperature of the heat carrying and distributing medium regardless of a fill degree of the thermal store, the thermal store comprises at least one elongated tube that filled with coarse particulate solid material with a narrow size distribution, or particular design, and the heat exchange is performed by sending the heat carrying and distributing fluid medium through the particulate solid matter in one or the other direction such that there is formed a cold and a hot zone in opposite ends of the at least one elongate tube that has a substantially homogeneous cold and hot temperature, respectively.

7. Method according to claim 2, wherein fresh hot and cold air is employed as the heat carrying and distributing fluid medium for heating or cooling the at least one ventilation unit of the building, and the ventilation and heat regulation of the at least one ventilation unit is achieved by suction of used air from the at least one ventilation unit which is replaced by balanced amounts of cold and/or hot fresh air to provide a desired temperature of the fresh replacement air in the at least one ventilation unit.

8. Method according to claim 2, wherein in order to obtain a stable and equal temperature of the heat carrying and distributing medium regardless of a fill degree of the thermal store, the thermal store comprises at least one elongated tube that is filled with coarse particulate solid material wit a narrow size distribution, or particular design, and the heat exchange is performed by sending the heat carrying and distributing fluid medium through the particulate solid matter in one or the other direction such that there is formed a cold and a hot zone in opposite ends of the at least one elongate tube that has a substantially homogeneous cold and hot temperature, respectively.

9. Method according to claim 6, the filling degree of the thermal store is determined by measuring the position of a temperature transition zone between the cold and hot zones of the thermal store.

10. Method according to claim 8, wherein the thermal store comprises at least one elongated tube that is filled with coarse particulate solid material with a narrow size distribution, and the heat exchange is performed by sending the heat carrying fresh air through the particulate solid matter in one or the other direction such that there is formed a cold and a hot zone in opposite ends of the at least one elongate tube that has a substantially homogeneous cold and hot temperature, respectively.

11. Method according to claim 8, wherein the regulating apparatus comprises means for registering and storing the actual micro-climate, as measured by heat drain or gain of the at least one ventilation unit, outdoor temperature, user settings, time of day, day of week, and season, and means for employing this data to estimate the corning 5–7 days of heating or cooling demand of the at least one ventilation unit.

12. Method according to claim 9, wherein the thermal store comprises at least one elongated tube that is filled wit coarse particulate solid material with a narrow size distribution, wherein the heat exchange is performed by sending the heat carrying fresh air through the particulate solid mater in one or the other direction such that there is formed a cold and a hot zone in opposite ends of the at least one elongate tube that has a substantially homogeneous cold and hot temperature, respectively.

13. Method according to claim 12, wherein the coarse particulate material of the thermal store is crushed concrete in a total amount of 0.5–2.0 $m^3$ per $m^2$ of ventilation unit floor area that is to be served.

14. Method according to claim 11, wherein the diameters of the coarse particulate material of the thermal store is in the range of 20–60 mm.

15. Method according to claim 13, wherein the temperature of the thermal store's cold zone is kept in the range of 5–20° C., preferably 7.59–15° C. and most preferably 8–12° C., and that the thermal store's hot zone is kept in the range of 30–60° C., preferably 35–50° and most preferably 40–45° C.

16. A apparatus configured for energy effective regulation of temperature and ventilation of at least one ventilation unit, comprising:

extracting means for extracting used air from the at least one ventilation unit;

replacing means for replacing the extracted used air with balanced amounts of hot and cold fresh air for the at least one ventilation unit;

a thermal store having hot and cold zones that are in communication with the replaced amounts of hot and cold fresh air, respectively, at least one heat-pump configured to exchange thermal energy wit the used air from the at least one ventilation unit, the hot and cold fresh air, and the hot and cold zones of the thermal store;

supplying means for supplying outdoor air directly into the ventilation units that are in communication with the replacing means;

discharging means for discharging air;

regulating means for regulating the replacing means, the discharging means, the supplying means, the thermal store, and the at least one heat pumps;

measuring means for measuring a fill degree of the thermal store;

forecast means for employing the weather forecast for the coming days to determine the most favourable periods for extracting thermal energy from outdoor air by the at least one heat pump;

predicting means for predicting the expected energy drain/gain from the at least one ventilation unit according to the weather forecast and a historical average consumption rates based on registered data for the heat drain/gain of the at least one ventilation unit with the actual outdoor temperature, user settings, time of day, day of week, and season; and control means for controlling the apparatus according to predicted heating/cooling demand and favourable periods for running the at least one heat pump.

17. Apparatus according to claim 16, wherein the thermal store comprises at least one elongated tube that is filled with coarse particulate solid concrete with a size in the range of 20–60 mm diameter in an total amount of 0.5–2.0 m$^3$ per m$^2$ of ventilation unit floor area that is to be served.

18. Apparatus according to claim 17, wherein the regulating means for regulating the apparatus according to the predicted heating/cooling demand and favourable periods for running the heat-pumps operates in three modes, wherein mode I is a neutral run condition where the heating demand can be covered without the use of the at least one heat-pump, mode II is a heating mode, and mode III is a cooling mode, and wherein mode I comprises;

passing outdoor air through a fan to the at least one ventilation unit, and then discharging the used ventilation air using the fan and a diverter, mode II comprises;

a normal heating mode where warm air supplied to or from the thermal store depending on outdoor temperature by using the same settings as mode I except that the diverter is shifted to pass used air through the at least one heat-pump and fresh air is heated and moved by the fan to the at least one ventilation unit, a first surplus heating mode where the at least one heat pump produces more heat than is consumed by the at least one ventilation unit while the thermal store is full or while mild/warm weather is expected, then the at least one heat pump is turned off, outdoor air is diverted through the thermal store by the diverters and transferred as warm fresh air by the fan the at least one ventilation unit, a second surplus heating mode where the at least one heat pump produces more heat than is consumed by the at least one ventilation unit when the thermal store is not full in the case when cool/colder weather is expected, then the remaining heat from the at least one heat pump is transferred to the thermal store through a 2-way fan, and diverted to exit at an outlet via the diverter, a third surplus heating mode where the weather is presently mild/warm but cold weather is expected while the thermal store is not full, then the at least one pump is started, taking in outdoor air at full capacity and charging the thermal store at 2–3 times ordinary flow rate through the 2-way fan with exit of cold air at, via the diverter while the fan simultaneously delivers warm air to the at least one ventilation unit as demanded, and mode III comprises;

a normal cooling mode in the case of presently warm weather, then warm air enters through the fan as warm, fresh air to the at least one ventilation such that warm air passing through the thermal store becomes cooled, and goes via the diverter and the fan as cool fresh air to the at least one ventilation, a second cooling mode in the case of presently cool/cold weather, then cool fresh air passes through the diverter to charge the thermal store, and exit as warm fresh air through the 2-way fan and exit via the diverter, and some of this air is led through the fan to the at least one ventilation unit as fresh, warm air, depending on demand from the at least one ventilation unit, a third cooling mode when presently and expected lasting warm weather, and with the thermal store in danger of being exhausted, then the at least one heat pump is turned on and warm fresh air enters to be cooled in the heat pump, then passing through the diverter to both the fan and the ventilation unit for cooling, and through the diverter to the thermal store for charging, and exits as warm air through the 2-way fan the diverter.

19. An energy exchange system, comprising:

a source of fresh hot and cold fluid;

a source of outdoor air;

a thermal store having hot and cold zones in communication with the source of fresh hot and cold fluid;

a heat-pump in communication with the source of fresh hot and cold fluid, the source of outdoor air, and the thermal store;

a forecaster configured to determine favourable time periods for extracting thermal energy from outdoor air by the heat pump;

a regulator configured to regulate flow of the fresh hot and cold fluid, the outdoor fluid, and flow to and from the thermal store and the heat pump; and a microprocessor for calculating an expected energy drain/gain from a ventilation unit according to information from the forecaster and a historical average consumption rate based on registered data for the heat drain/gain of the at least one ventilation unit with the actual outdoor temperature, user settings, time of day, day of week, and season.

* * * * *